United States Patent Office 3,379,757
Patented Apr. 23, 1968

3,379,757
MALIC ACID SYNTHESIS
Leon O. Winstrom, East Aurora, and John W. Frink, Buffalo, N.Y., assignors to Allied Chemical Corporation, New York, N.Y., a corporation of New York
No Drawing. Filed Dec. 30, 1964, Ser. No. 422,426
9 Claims. (Cl. 260—535)

ABSTRACT OF THE DISCLOSURE

An improved process for the preparation of malic acid from an aqueous solution of maleic acid obtained by scrubbing the converter effluent gases derived from the vapor phase catalytic oxidation of an organic compound. The improvement consists in ageing of aqueous maleic acid in the presence of air.

---

The synthesis of malic acid from maleic acid involves the isomerization of maleic acid to fumaric acid and the hydration of the latter to malic acid. This well known process is carried out at elevated temperatures and under superatmospheric pressure.

Malic acid is being utilized in increasing amounts as a flavoring agent and as an acidulant in compositions intended for human consumption. As such the quality of the malic acid product is of prime importance.

In the prior art descriptions of this procedure pure maleic anhydride or acid has been specified. As is well known, these materials are produced commercially by the vapor phase catalytic oxidation of organic compounds such as benzene, butene, furane, furfural and the like. This process generally involves the partial condensation of maleic anhydride from the converter gases which thereafter are scrubbed with water or other aqueous solutions to remove therefrom residual maleic acid values. Various by-product materials, such as quinones, and other partial oxidation products are removed also. The resultant dark solution of maleic acid represents a potentially more economic starting material for malic acid than maleic anhydride. However, due to the presence of the above-mentioned contaminants, direct conversion of this maleic acid solution to malic acid results in a product which is of poor quality and one which is difficult and expensive to purify. Various methods, including treatment with activated carbon, are only partially successful or too costly.

It is a principal object of our invention to provide an efficient and economical process of producing malic acid from aqueous maleic acid solutions obtained by scrubbing of the converter gases resulting from the catalytic vapor phase oxidation of organic compounds, notably benzene.

Other objects of the invention will in part be obvious and in part appear hereinafter.

We have made the surprising discovery that malic acid of excellent quality can be produced in an efficient and economical manner from aqueous solutions of maleic acid obtained by scrubbing effluent converter gases resulting from the catalytic vapor phase oxidation of organic compounds which comprises absorbing said maleic acid containing converter gases in water, ageing the resulting solution in the presence of air, at a temperature of at least 40° C. and for at least two hours, separating the solid impurities which precipitated from the aged solution and heating the resulting filtrate in a closed system under superatmospheric pressure to convert the maleic acid to malic acid.

By the process of the present invention malic acid of excellent quality can be produced from crude aqueous solution of maleic acid without the expensive intermediate isolation and purification of maleic acid.

The ageing of the crude maleic acid solution can be carried out over a wide range of temperatures, i.e., from 40° C. to the boiling point of the solution, and for times which can extend from at least two hours, at 40° C., to relatively shorter periods at more elevated temperatures. The minimum time required to effect substantially complete coalescence of the major impurities, if that is what occurs, varies inversely with the temperature of this ageing step. We prefer to carry out this step at a temperature within the range of 50° to 80° C., especially at about 70° C., for a period of time within the range of about 3 to 6 hours preferably about 4 to 5 hours.

This ageing process to be effective requires the presence of air. The amount of air, we have found, can be varied over a considerable range. Thus bubbling air through the crude maleic acid solution while maintaining said solution at 40° C. or higher is highly effective. However, the unaged crude maleic acid solution contains, or on standing at about 40° C. or higher will absorb, sufficient air to be effective in the ageing. As will be obvious, the crude solutions will vary considerably in their content of impurities and consequently the degree of effectiveness of the ageing process will vary with the time and temperature as well as the amount of impurities. In other words, the less impurities the solution contains the milder the conditions required. Surprisingly, we have found that the time required to effect a significant amount of ageing when the crude solution is maintained at ambient temperatures is so long as to be impractical, while the rates of the reactions involved in the ageing process increase rapidly as the temperature is increased. These reaction rate(s) apparently attain practical values at about 40° C.

The solution following the ageing process contains insoluble matter which can be removed by any convenient means, as by filtration, centrifugation and the like.

The clarified filtrate is preferably then treated with decolorizing charcoal in the conventional manner.

It is most convenient and hence especially preferred to combine the ageing step and charcoal treatment by passing the crude maleic acid solution through a carbon absorption tower maintained at about 70° C. at such a rate that the residence time of the maleic acid solution in the carbon tower is about 4 to 5 hours. Alternatively, the carbon may be added to the hot (about 70° C.) maleic acid solution and permitted to remain in contact with said solution, preferably with intermittent agitation to maintain the carbon suspended in the solution, and thereafter filtering the carbon from the aged solution.

The conversion of the aged maleic acid solution to maleic acid can be carried out in a known manner, either batchwise or continuously. When carried out batchwise, the aged aqueous solution of maleic acid, to which fumaric acid preferably is added, is heated in closed reactor at a temperature above about 160° C., and preferably at about 180° to 200° C., under superatmospheric pressure, preferably from about 190 to about 250 p.s.i.g., and for a period of at least 2 hours preferably from about 3 to about 5 hours. Thereafter the reaction mixture is cooled to a suitable lower temperature to crystallize and separate most of the fumaric acid from the more soluble maleic and malic acids. The fumaric acid crystals are separated in any convenient manner, as by filtration or centrifugation, and the malic acid containing filtrate is concentrated to effect the separation of malic acid in a known manner. The mother liquor from the fumaric acid separation may be treated with ion exchange resins in a known manner to remove undesirable metal ions, if present prior to the isolation of malic acid.

Due to the corrosive nature of the aqueous maleic acid solution, the equipment exposed thereto, and especially the reactor in which the conversion to malic acid is effected, is constructed of acid resistant materials. Preferably equipment fabricated, in whole or in part, from a metal of the group consisting of titanium, zirconium and tantalum is used, as disclosed in copending application of C. R. Ahlgren, Ser. No. 404,166, filed Oct. 15, 1964.

The novel process can be carried out continuously also. In such a procedure, the crude aqueous maleic acid, containing about 30 to 50% by weight of maleic acid is simultaneously aged, carbon treated, and clarified by flowing the solution upwardly in a rubber lined steel tower maintained at about 70° C. The solution flows countercurent to a moving bed of activated carbon which is continuously discharged from the bottom of the tower. The flow rate of the maleic acid solution is adjusted to provide a residence time of about 4 hours. Thereafter the aged, carbon treated maleic acid solution is admixed with fumaric acid crystals obtained from a previous run and the hot (70° C.) slurry is fed continuously to a reactor maintained at 175°–185° and a pressure of about 215 p.s.i.g.

The maleic acid fumaric acid mixture is fed at a rate such as to provide a residence time of about 3 to 4 hours, and flows out of the reactor into a crystallizing vat wherein it is cooled to about 25° to 50° C. The slurry is filtered to remove fumaric acid. The mother liquor may be further concentrated to recover malic acid therefrom. The malic acid can be recrystallized from water to obtain a product suitable for use in edible compositions.

The following examples will illustrate the process of the present invention. Parts and percentages are by weight and temperatures are given in degrees centigrade.

Example 1

Aqueous maleic acid obtained by scrubbing the effluent gas stream from a catalytic vapor phase oxidation of benzene, containing 39.2% maleic acid, was fed into an activated carbon tower (1 in. ID x 270 in. high) at ambient temperature and at the rate of 750 parts by volume per hour. The carbon treated solution emanating from the tower was fed at the rate of 661 parts by volume per hour into the first of three titanium reactors, each maintained at 185° and under 215 p.s.i.g. nitrogen pressure. The maleic acid solution flowed by plug flow through the three reactors which were connected by means of over flow pipes. The flow rate was such as to provide aproximate residence times of 2.5 hours, 1.6 hours, and 0.84 hour resp. in the three connected reactors. The total approximate residence time was thus 4.94 hours. A total 19,830 parts by volume of solution containing 7,580 parts of maleic acid were run through the system in 30 hours.

The resultant solution emanating from the last reactor was colored a very dark brown. The solution was cooled to about 40°. A dark chocolate brown fumaric acid separated from this solution. The mother liquor after separation of the crystallized fumaric acid was dark brown in color, also. By concentration of this mother liquor, brownish colored malic acid was obtained.

Example 2 (control)

In substantially the same manner as described in Example 1 above, 4090 parts of the crude aqueous maleic acid, containing 39.8% maleic acid, were converted to fumaric and malic acids, being fed to the converters at the rate of 648 parts by volume per hour. This run took 16 hours. The crude maleic acid feed liquor was held at 60° for 48 hours while bubbling a slow stream of nitrogen through the liquor prior to entrance into the carbon treatment tower which was maintained at ambient temperature. The liquor emanating from the reactor train, was very dark brown in color. The fumaric acid obtained was also dark brown in color. The malic acid obtained from the mother liquor was brown colored also.

Example 3

In substantially the same manner as described in Example 2 above, 26,800 parts by volume of crude aqueous maleic acid, containing 40.2% maleic acid, were converted at the rate of 724 parts by volume per hour (residence time 1,24 hours in each reactor) to a mixture of fumaric and malic acids. The crude maleic acid feed solution was first aged by standing for 24 hours at 70° while a slow stream of air was bubbled through the solution. The mixture was then filtered and passed through the carbon tower at ambient temperature.

The liquor emanating from the last reactor was light tan in color and deposited on off-white fumaric acid. The mother liquor was clear light amber color and gave, on concentration, a nearly colorless malic acid, which was readily and efficiently purified to a white, food grade, malic acid.

Example 4

Following substantially the same procedure as described in Example 3 above, save that the crude maleic acid solution was aged for only 6 instead of 24 hours at 70°, there resulted a lightly colored fumaric acid and also a high quality crude malic acid.

Example 5

In this example, the ageing and the carbon treatment steps were combined. The crude aqueous maleic acid was passed through the carbon column, 270 in. x 1 in., maintained at 70°, at the rate of 750 parts by volume per hour. This corresponds to an average residence time of 4½ hours. The aged solution was then passed through the reactor train substantially as described in the above examples to yield a very light brown liquor, from which high quality crude fumaric and malic acid were separated.

Example 6

Repetition of the procedure of Example 5 but with the combined ageing and carbon treatment steps being carried out at 58° to 60° instead of 70°, resulted in a light brown colored product liquor at the reactor train exit. From this liquor good quality fumaric and malic acids was obtained.

From the above purely illustrative examples it can be seen that an efficient and economical process for the production of malic acid from crude solutions of maleic acid has been devised.

The invention has been described in the above specification and illustrated by means of the several examples. As will be apparent to those skilled in this art, numerous modifications in the details of the above description and examples can be made without departing from the scope or spirit of this invention.

We claim:

1. A process for the manufacture of malic acid from aqueous solutions of maleic acid resulting from the vapor phase catalytic oxidation of an organic compound which comprises absorbing maleic acid contained in the converter gas into water, ageing the resulting solution in the presence of air, at a temperature of at least about 40° C. and for at least about two hours, filtering the aged solution to remove solid impurities and heating the filtrate to a temperature above about 160° C. in a closed system under superatmospheric pressure to convert the maleic acid to malic acid.

2. The process of claim 1 in which the organic compound is benzene.

3. The process of claim 2 in which the ageing step is accomplished at a temperature within the range of 50° to 80° C.

4. The process of claim 3 in which the ageing step is carried out at about 70° C.

5. The process of claim 3 in which the crude maleic acid solution is maintained at the ageing temperature for a period of about 3 to 6 hours.

6. The process of claim 4 in which the crude maleic acid solution is maintained at about 70° C. for about 4 to 5 hours.

7. The process of claim 2 in which the aged solution is treated with decolorizing charcoal prior to conversion to malic acid.

8. The process of claim 7 in which the ageing step and the charcoal treatment step are combined and carried out simultaneously.

9. The process of claim 2 in which the aqueous solution contains about 30 to 50% by weight of maleic acid.

References Cited

UNITED STATES PATENTS 1,318,633  10/1919  Weiss et al. _____ 260—537
2,393,352  1/1946  Winstrom _____ 260—537
2,500,260  3/1950  Newton _____ 260—537
3,054,806  9/1962  Feder _____ 260—537

FOREIGN PATENTS

25/4,360  12/1950  Japan.
476,109   1937    Great Britain.

LORRAINE A. WEINBERGER, *Primary Examiner.*

A. P. HALLUIN, *Assistant Examiner.*